US012441961B2

(12) United States Patent
Saveyn et al.

(10) Patent No.: US 12,441,961 B2
(45) Date of Patent: Oct. 14, 2025

(54) HOUSEHOLD CLEANING COMPOSITION

(71) Applicant: The Procter & Gamble Company, Cincinnati, OH (US)

(72) Inventors: Pieter Jan Maria Saveyn, Heusden (BE); Mark Robert Sivik, Mason, OH (US); Evelyne Johanna Lutgarde Van Hecke, Bachte-Maria-Leerne (BE)

(73) Assignee: The Procter & Gamble Company, Cincinnati, OH (US)

( * ) Notice: Subject to any disclaimer, the term of this patent is extended or adjusted under 35 U.S.C. 154(b) by 345 days.

(21) Appl. No.: 18/338,385

(22) Filed: Jun. 21, 2023

(65) Prior Publication Data

US 2023/0416647 A1 Dec. 28, 2023

(30) Foreign Application Priority Data

Jun. 22, 2022 (EP) .................................... 22180286

(51) Int. Cl.

*C11D 3/00* (2006.01)
*C11D 1/12* (2006.01)
*C11D 1/88* (2006.01)
*C11D 3/37* (2006.01)

(52) U.S. Cl.

CPC .............. *C11D 3/3753* (2013.01); *C11D 1/12* (2013.01); *C11D 1/88* (2013.01)

(58) Field of Classification Search

CPC ........... C11D 3/3753; C11D 1/12; C11D 1/88; C11D 3/3757

USPC .......................................................... 510/356

See application file for complete search history.

(56) References Cited

U.S. PATENT DOCUMENTS

| | | | | |
|---|---|---|---|---|
| 7,767,282 | B2 | 8/2010 | Morken | |
| 2017/0362551 | A1 | 12/2017 | Merlet et al. | |
| 2018/0265818 | A1 * | 9/2018 | Smets | C11D 3/3753 |
| 2018/0265826 | A1 * | 9/2018 | Song | C11D 3/166 |
| 2020/0002653 | A1 * | 1/2020 | Smets | C11D 3/0015 |

FOREIGN PATENT DOCUMENTS

| | | | |
|---|---|---|---|
| EP | 0584736 | B1 | 1/1999 |

OTHER PUBLICATIONS

Extended EP Search Report and Opinion for 22180286.1 dated Jan. 16, 2023, 5 pages.

* cited by examiner

*Primary Examiner* — Eisa B Elhilo

(74) *Attorney, Agent, or Firm* — George H. Leal; Kathleen Y. Carter; Sanaul K. Siddiquee

(57) ABSTRACT

The need for a liquid hand-dishwashing composition having good phase stability and finished product viscosity which provides improved sudsing volume and longevity when washing in the presence of greasy soil, is met when the composition is formulated with from about 1.0% to about 50% of a sudsing surfactant system and a polyvinyl alcohol copolymer.

20 Claims, No Drawings

HOUSEHOLD CLEANING COMPOSITION

FIELD OF THE INVENTION

The present invention relates to household cleaning compositions, such as hand dishwashing compositions, automatic dishwashing compositions, liquid laundry detergent compositions, hard surface cleaning compositions, laundry detergent gels, bleaching compositions, laundry additives, fabric enhancer compositions, and mixtures thereof, preferably a hand dishwashing composition.

BACKGROUND OF THE INVENTION

For many household cleaning applications, such as hand dishwashing, manual laundry cleaning, oven cleaning, and the like, good, stable sudsing is highly desired. For instance, during manual dishwashing in a sink full of water into which a cleaning composition has been diluted, the user typically relies on the level of suds to indicate the remaining cleaning efficacy of the diluted cleaning composition. A high suds volume and/or stable, long-lasting suds longevity (i.e., mileage) indicates to the user that sufficient active ingredients (e.g., surfactants) remain, in order to perform the desired cleaning. Poor suds longevity typically leads to the user dosing additional cleaning composition even when cleaning efficacy remains. Similarly for handwashing of laundry.

Anionic surfactants have been used to provide suds during hand dishwashing, with alkyl sulphate and alkyl alkoxy sulphates having a high proportion of C12, C13 and C14, particularly C12 and C13 chains being found to be particularly effective at providing improved sudsing in addition to the desired cleaning. Such sulphated surfactants can be derived from synthetic alcohols, such as OXO-alcohols and Fischer-Tropsch alcohols, or from naturally derived alcohols, or from mixtures thereof. Fractionation can be used to increase the proportion of C12, C13 and C14, preferably C12 and C13 alkyl chains. In order to further boost suds volume and/or longevity, these anionic surfactants are typically formulated together with further co-surfactants selected from the group consisting of amphoteric surfactants, zwitterionic surfactants, nonionic surfactants, alternative anionic surfactants, or mixtures thereof.

The suds volume and longevity are significantly affected by the presence of greasy soils, especially when high levels of greasy soils are present in the dishwashing liquor. Homopolymers of polyvinyl alcohol have been disclosed for improving sudsing in the presence of greasy soils. Such polyvinyl alcohols have been found to be particularly effective at higher molecular weights, or degrees of polymerisation (DP). However, formulating such long chain polyvinyl alcohol homopolymers into household cleaning compositions typically results in reduced phase stability of the composition.

Suds volume and mileage are traditionally achieved through formulation of high surfactant levels. However, there is a demand to reduce the overall carbon footprint of detergent formulations. Therefore, a formulator is looking for more weight efficient detergent actives, allowing him to partially replace the surfactant system by these more weight efficient actives, while sustaining product performance. A reduction in surfactant level typically comes together with a reduction in composition viscosity.

As such, a need remains for a hand dishwashing composition which provides improved sudsing volume and suds longevity, especially in the presence of greasy soil, without detrimentally affecting the phase stability nor the viscosity of the hand dishwashing detergent composition.

EP3730594A1 relates to a liquid hand dishwashing composition which provides further improved sudsing volume and longevity when washing dishware using diluted liquid hand dishwashing compositions, especially in the presence of greasy soil and particulate soil, while still providing the desired cleaning, wherein the composition is formulated with from 5% to 50% of a sudsing surfactant system and polyvinyl alcohol having a viscosity of from 20 mPa·s to 55 mPa·s. EP3730596A1 relates to a liquid hand dishwashing cleaning composition that is less hazy, while also provides reduced surface tension between the detergent composition and the soiled plate, and hence improvements in cleaning, wherein the liquid hand dishwashing cleaning composition is formulated with a surfactant system and a polyvinyl alcohol having a degree of hydrolysis of from 40% to 86%. EP3988634A1 relates to a liquid hand dishwashing composition which provides further improved sudsing volume and longevity when washing dishware using diluted liquid hand dishwashing compositions, especially in the presence of greasy soil, while still providing the desired cleaning, wherein the composition is formulated with from 5% to 50% of a sudsing surfactant system and from 0.05% to 5.0% polyvinyl acetal polymer. U.S. Pat. No. 3,629,122A relates to low-foaming rinsing and washing compositions adapted for dishwashers consisting essentially of (A) from 70% to 98% by weight of water-soluble polyvinyl alcohols having a molecular weight of between 1000 and 4000, and (B) from 2% to 30% by weight of foam-inhibiting compounds selected from the group consisting of aliphatic alcohols, aliphatic carboxylic acids and alkali metal salts 20 thereof, aliphatic carboxylic acid amides and aliphatic amines, said compounds having at least one aliphatic or aliphatic-cycloaliphatic radical with from 8 to 22 carbon atoms, as well as aqueous solutions containing said low-foaming rinsing and washing compositions. CN107057861A relates to a cleaning preparation for porcelain glazes and glass utensils. The cleaning preparation comprises solid acid, carbonate and/or hydrogen carbonate, thickener and/or stabilizer and surfactant and further comprises disinfecting agent, aromatic agent, deodorant and dispersant. CN104818134 relates to a tea scale detergent. The tea scale detergent is prepared by, by weight, 5-10 parts of sodium chloride, 3-8 parts of sodium dichloro isocyanurate, 7-11 parts of sodium lauryl polyoxyethylene ether sulphate, 1-3 parts of deoiling emulsifier, 3-7 parts of trichloro hydroxydiphenyl ether, 4-8 parts of sodium dodecyl benzene sulphonate, 3-5 parts of sodium sulphate, 5-10 parts of lauroyl diethanolamide, 3-9 parts of citric acid, 1-5 parts of poval, 4-6 parts of hexa polyglycerol monooctanoin ether, 1-3 parts of sodium carbonate, 6-10 parts of sucrose fatty acid ether and 80 parts of water. The tea scale detergent seeks to provide the benefits of being capable of quickly cleaning tea scale, extremely low in residue, harmless to the human body, little in foam and easy to clean. U.S. Pat. No. 4,539,145A relates to an outside window cleaner comprising mixtures of one or more polyvinyl alcohols with water, or preferably, polyvinyl alcohol, a cationic polymer, such as trimethylol melamine, and water, alters or modifies window or other hard surfaces such that water drains off in uniform sheets, leaving virtually no residue or spots caused from the deposition of dirt, cleaning compositions or a combination of the two. In a further embodiment, a selected cationic or nonionic surfactant is added to the formula of this invention to improve detergency while retaining the uniform drainage advantage in rinsing. CN104371855 relates to a low-foam glass cleaner which is prepared from the following raw materials in parts by weight: 6-8 parts of ethyl cellosolve, 3-9 parts of glycerol, 6-9 parts of borage seed oil, 6-9 parts of vaseline, 0.2-1 part of ammonia water, 5-8 parts of sodium bicarbonate, 6-8 parts of polyvinyl alcohol, 5-7 parts of sodium lauryl sulphate, 2-4 parts of silicone, 5-10 parts of alkanolamide, 5-11 parts of fatty alcohol polyethenoxy ether, 2-6 parts of butanediol, 3-6 parts of triethanolamine, 4-8 parts of cocamidopropyl betaine, 2-6 parts of sodium benzoate and 1-5 parts of tetradecyl alcohol. The low-foam glass cleaner has the advantages of low foam and low cost, is easy to clean, and has certain antifogging function in the cleaning process. WO2018/169532A relates to benefit agent containing delivery particles suitable for use in consumer products, which comprise polyvinyl alcohol in the encapsulated core. U.S. Pat. No. 9,913,781B relates to a detergent composition including pigment granules containing a water-insoluble pigment, and at least two compounds selected from the group consisting of polyvinyl alcohol, a polyvinyl alcohol derivative, polyvinyl pyrrolidone and a polyvinyl pyrrolidone derivative.

SUMMARY OF THE INVENTION

The present invention relates to a household cleaning composition comprising: from 1.0% to 50% by weight of the total composition of a surfactant system; and a polyvinyl alcohol copolymer, wherein the polyvinyl alcohol copolymer comprises vinyl alcohol monomer units, vinyl acetate monomer units and alkyl-1-ene monomers, wherein the alkyl-1-ene monomers have an alkyl chain comprising on average from 8 to 20 carbon atoms, wherein the polyvinyl alcohol copolymer has: an average degree of hydrolysis (dH) of from 30% to 80%, a weight average degree of polymerisation (dP) of from 200 to 800, and an average degree of alkyl-1-ene monomer molar substitution (dS) of from 0.25% to 4.0%.

DETAILED DESCRIPTION OF THE INVENTION

Formulating the household cleaning composition with a surfactant system and the polyvinyl alcohol copolymer, as described herein, has been found to improve sudsing volume and suds longevity, especially in the presence of greasy soil, without detrimentally affecting the phase stability nor the finished product viscosity of the household cleaning detergent composition As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of." The compositions of the present invention can comprise, consist of, and consist essentially of the essential elements and limitations of the invention described herein, as well as any of the additional or optional ingredients, components, steps, or limitations described herein.

The term "grease" or "greasy" as used herein means materials comprising at least in part (i.e., at least 0.5 wt % by weight of the grease in the material) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a cleaning composition relating to suds character during the dishwashing process. The term "sudsing profile" of a cleaning composition includes initial suds volume generated upon dissolving and agitation, typically manual agitation, of the cleaning composition in the aqueous washing solution, and the retention of the suds during the dishwashing process. Preferably, hand dishwashing cleaning compositions characterized as having "good sudsing profile" tend to have high initial suds volume and/or sustained suds volume, particularly during a substantial portion of or for the entire manual dishwashing process. This is important as the consumer uses high suds as an indicator that enough cleaning composition has been dosed. Moreover, the consumer also uses the sustained suds volume as an indicator that enough active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

The term "homopolymer" generally includes polymers having a single type of monomeric repeating unit (e.g., a polymeric chain comprising or consisting of a single monomeric repeating unit). For the particular case of polyvinylalcohol, the term "homopolymer" further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinylalcohol homopolymer can include only vinyl alcohol units.

The term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinylalcohol, the term "copolymer" (or "polyvinylalcohol copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain comprising or consisting of vinyl alcohol monomer units, vinyl acetate monomer units, and one or more other monomer units. In the case of 100% hydrolysis, a polyvinylalcohol copolymer can include a copolymer having vinyl alcohol units and one or more other monomer units, but no vinyl acetate units.

It is understood that the test methods that are disclosed in the Test Methods Section of the present application must be used to determine the respective values of the parameters of Applicants' inventions as described and claimed herein.

All percentages are by weight of the total composition, as evident by the context, unless specifically stated otherwise. All ratios are weight ratios, unless specifically stated otherwise, and all measurements are made at 25° C., unless otherwise designated.

Household Cleaning Composition

The term "household cleaning compositions" as used herein are used for cleaning inanimate surfaces around the home, and includes hand dishwashing compositions, laundry detergent compositions (especially manual laundry detergent compositions), hard surface cleaning compositions, bleaching compositions, laundry additives, and mixtures thereof. Preferred household cleaning compositions are hand dishwashing compositions, laundry detergent compositions, with hand dishwashing compositions being particularly preferred.

"Dishwashing compositions, such as liquid hand dishwashing compositions are suitable for cleaning dishware. The term "dishware" as used herein includes cookware and tableware made from, by non-limiting examples, ceramic, china, metal, glass, plastic (e.g., polyethylene, polypropylene, polystyrene, etc.) and wood.

The household cleaning composition can be in any suitable form, such as liquid, paste, granular, solid, powder, or in conjunction with a carrier such as a substrate. Preferred compositions are either liquid or granular, with liquid being most preferred. The household cleaning composition is preferably a liquid cleaning composition, preferably a liquid hand dishwashing cleaning composition. The liquid cleaning composition is preferably an aqueous cleaning composition. As such, the composition can comprise from 50% to 85%, preferably from 50% to 75%, by weight of the total composition of water.

The cleaning composition has a pH greater than 6.0, or a pH of from 6.0 to 12.0, preferably from 7.0 to 11.0, more preferably from 8.0 to 10.0, measured as a 10% aqueous solution in demineralized water at 20 degrees ° C.

The liquid cleaning composition of the present invention can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof.

Polyvinyl Alcohol Copolymer

The household cleaning composition comprises a polyvinyl alcohol copolymer, wherein the polyvinyl alcohol copolymer comprises vinyl alcohol monomer units, vinyl acetate monomer units and alkyl-1-ene monomers.

The polyvinyl alcohol copolymer is partially hydrolysed, typically via saponification. The polyvinyl alcohol copolymer has an average (mol %) degree of hydrolysis (dH) of from 30% to 80%, preferably from 40% to 80%, more preferably from 60% to 80%. When the degree of hydrolysis (dH) of the polyvinyl alcohol copolymer is within the above range, the solubility of the resultant polyvinyl alcohol copolymer in surfactant-containing aqueous compositions is likely to be improved, and a highly transparent composition can be obtained.

The polyvinyl alcohol copolymer has a weight average degree of polymerization (dP) of from 200 to 800, preferably from 300 to 700, more preferably of from 400 to 600.

Within this range of the weight average degree of polymerization (dP), a higher thickening effect can be expected, while excessive thickening and poor solubility is avoided.

The polyvinyl alcohol copolymer has an average degree of alkyl-1-ene monomer molar substitution (dS) of from 0.25% to 4.0%, preferably from 0.5% to 3.0%, more preferably from 1.0% to 2.0%. Polymerisation with the alkyl-1-ene monomers introduces alkyl group-containing monomer units into the copolymer. The content of the alkyl-1-ene monomers (and hence the alkyl group-containing monomer units) in the polyvinyl alcohol copolymer is important to achieve the desired viscosity and solubility in detergent compositions. When the content of the alkyl-1-ene monomer unit is at least above the lower limit, the degree of polymerization is likely to be improved and a high resultant viscosity is achieved. Further, when the content of the alkyl-1-ene monomers is too high, solubility of the resultant polyvinyl alcohol copolymer in detergent compositions is reduced.

The alkyl-1-ene monomers, commonly also referred to as α-olefin, have an alkyl chain comprising on average from 8 to 20, preferably from 10 to 18, more preferably from 12 to 16 carbon atoms. Preferably the alkyl-l-ene monomers comprise at least 80%, preferably at least 90%, more preferably at least 95% or even at least 98% by weight of the alkyl-1-ene monomers of alkyl-1-ene monomers comprising from 12 to 16 carbons, in order to provide improved stability for the composition. The alkyl-1-ene monomers can be linear or branched. Single alkyl-1-ene monomers can be used, or a blend of alkyl-1-ene monomers can be used in the polymerisation reaction.

The polyvinyl alcohol copolymer is preferably a random copolymer. As such, the monomer units are randomly distributed through the copolymer.

The copolymers of use in the present invention having a mol average degree of hydrolysis, an average degree of polymerization and average degree of molar substitution as described above have been found to provide improved suds mileage, especially in presence of greasy soils, while also maintaining composition stability and sustaining or even building composition viscosity.

Increasing the average degree of hydrolysis beyond the desired range results in greater difficulty in maintaining composition stability and the suds mileage benefit is also reduced.

Reducing the average degree of polymerization below the desired range results in a less desired composition viscosity. A higher average degree of polymerization results in reduced composition stability, as well as the copolymer becoming difficult to process since it is more challenging to dissolve in an aqueous solution.

A lower alkene chain length results in the monomer being too volatile for the copolymerization reaction. A higher alkene chain length results in the copolymer becoming more hydrophobic, leading to excessive viscosity of the resultant composition and poor phase stability.

The polyvinyl alcohol copolymer preferably satisfies the formula (I):

$$0.025 \leq dH/(dS*dP) \leq 0.60 \qquad (I)$$

Preferably, the polyvinyl alcohol copolymer satisfies the formula:

$$0.067 \leq dH/(dS*dP) \leq 0.150$$

The polyvinyl alcohol copolymer can be present at a level of from 0.1% to 4.0%, preferably from 0.25% to 3.0%, more preferably from 0.5% to 2.0% by weight of the composition.

There are no particular restrictions to a process for producing the polyvinyl alcohol copolymer, but it is preferably produced by co-polymerizing a vinyl ester with the 1,2-alkene followed by partial hydrolysis (saponification). Examples of such a vinyl ester include vinyl acetate, vinyl formate, vinyl propionate, vinyl caprylate and vinyl versatate; among others, vinyl acetate is preferable.

Co-polymerization of a vinyl ester with the 1,2-alkene can be conducted by any polymerization method such as bulk polymerization, solution polymerization, suspension polymerization and emulsion polymerization. The polymerization can be conducted neat or in the presence of an alcoholic solvent. Among these, bulk polymerization in neat system or solution polymerization using an alcoholic solvent can be suitably employed.

Examples of the alcoholic solvent include, but are not limited to, methanol, ethanol and propanol, which can be used alone or in combination of two or more alcoholic solvents.

There are no particular restrictions to a polymerization style, which can be any of batch polymerization, semi-batch polymerization, continuous polymerization and semi-continuous polymerization.

There are no particular restrictions to a conversion of the vinyl ester in the co-polymerization. A conversion of the vinyl ester is preferably 10 to 80%, more preferably 30 to 70%. If the conversion is lower than 10%, the productivity may be ineffective. If the conversion is higher than 80%, the process is typically less safe to run due to increased viscosity.

There are no particular restrictions to a temperature during co-polymerization (polymerization temperature) of the vinyl ester with the 1,2-alkene. The polymerization temperature is preferably from 0° C. to 200° C., more preferably from 30° C. to 140° C. If the temperature is lower than 0° C., the polymerization rate may be insufficient. If the temperature is higher than 200° C., the vinyl ester used may be decomposed.

There are no particular restrictions to the method for controlling the co-polymerization temperature of the vinyl ester with the 1,2-alkene. For example, the temperature can be controlled by controlling a co-polymerization rate to make a balance between heat generation due to co-polymerization and heat release from the surface of the co-polymerization reactor, or by using an external jacket with a proper heat medium. In the light of safety, the latter method is preferable.

A polymerization initiator may be used in the preparation of the polyvinyl alcohol copolymer. The polymerization initiator may be selected from known initiators depending on the polymerization method. Specifically, for example, 2,2'-azobisisobutyronitrile, 2,2'-azobis (2,4-dimethylvaleronitrile), 2,2'-azobis (4-methoxy-2,4-). Azo-based initiators such as dimethylvaleronitrile), such as percarbonate compounds such as diisopropylperoxydicarbonate, di-2-ethylhexylperoxydicarbonate, diethoxyethylperoxydicarbonate; t-butylperoxyneodecanate can be used. Per-ester compounds such as α-cumylperoxyneodecanete and t-butylperoxydecanete; acetylcyclohexylsulfonyl peroxides; peroxides such as 2,4,4-trimethylpentyl-2-peroxyphenoxyacetate can also be used.

The amount of the polymerization initiator may be appropriately determined according to the monomer to be used, the type of the initiator, the desired degree of polymerization, etc.

The polymerization conditions and the like may be appropriately determined according to the type and amount of the monomer to be used, desired physical properties, the polymerization method to be adopted and the like. For example, the polymerization temperature is usually 0 to 150° C., preferably 20 to 120° C.

Within the co-polymerization the molar ratio of the vinyl acetate and the 1,2-alkene is defined by the targeted degree of substitution. As such the reaction vessel will typically comprise from 0.25 mol % to 4.0 mol %, preferably from 0.5 mol % to 3.0 mol %, more preferably from 1.0 mol % to 2.0 mol % of the 1,2-alkene by mol % of the total 1,2-alkene and vinyl acetate monomer content in the reaction vessel, the remainder being vinyl acetate monomers. As both monomers are added together at start of the co-polymerization reaction, a random alkyl-1-ene substitution is obtained.

The ester functions within the obtained vinyl-acetate/alkyl-1-ene copolymer can be partially saponified by any known saponification method without limitation; for example, alcoholysis or hydrolysis using a basic catalyst such as sodium hydroxide, potassium hydroxide and sodium methoxide. Examples of a solvent which can be used in the reaction include alcohols such as methanol and ethanol; esters such as methyl acetate and ethyl acetate; ketones such as acetone and methyl ethyl ketones: and aromatic hydrocarbons such as benzene and toluene. These solvents can be used alone or in combination of two or more solvents. It is particularly convenient and preferable that saponification is conducted using methanol or a mixture of methanol/methyl acetate as a solvent and a basic catalyst such as sodium hydroxide. The saponification reaction will result in a random distribution of remaining acetate and yielded alcohol groups. As such a random co-polymer will be obtained, with a random distribution of vinyl acetate, vinyl alcohol and alkyl-1-ene monomers.

Hydrolysis is typically achieved via saponification. For the saponification reaction, a conventionally known basic catalyst such as sodium hydroxide, potassium hydroxide, or sodium methoxydo, or an acidic catalyst such as p-toluene sulfonic acid can be used. Alcohol decomposition or hydrolysis reactions may be applied. Examples of the solvent used for the saponification reaction include alcohols such as methanol and ethanol; esters such as methyl acetate and ethyl acetate; ketones such as acetone and methyl ethyl ketone; aromatic hydrocarbons such as benzene and toluene. These may be used alone or in combination of such solvents. Among them, as the saponification reaction, a method in which methanol or a mixed solution of methanol and methyl acetate is used as a solvent and the saponification reaction is carried out in the presence of sodium hydroxide as a basic catalyst is preferable.

The amount of the catalyst used in the saponification reaction may be appropriately determined according to the type of catalyst used, the desired degree of saponification, and the like. The amount of the basic catalyst, if used, is preferably from 0.002 to 0.2, particularly preferably 0.004 to 0.1 as a molar ratio based on vinyl ester units in the obtained copolymer, the amount pending the targeted degree of hydrolysis. The saponification catalyst can be added in one portion at the initiation of the saponification reaction. Alternatively, a part of the catalyst may be added at the initiation of the saponification reaction followed by adding the remaining catalyst in the course of the saponification reaction.

The saponification reaction is preferably conducted at a temperature of from 5° C. to 80° C., more preferably from 20° C. to 70° C. The time required for the saponification reaction is preferably from 5 min to 10 hours, more preferably from 10 min to 5 hours. The saponification reaction can be conducted by either batch or continuous processes. At the end of the saponification reaction, the remaining saponification catalyst can be, if necessary, neutralized, and examples of a neutralizing agent which can be used include organic acids such as acetic acid and lactic acid and ester compounds such as methyl acetate. The set time and temperature will again be defined by the desired degree of hydrolysis.

The alkaline substance, derived from an alkali metal, added during the saponification reaction is generally neutralized with an ester such as methyl acetate generated as proceeding the saponification reaction or an organic acid such as acetic acid added after saponification, to give an alkali metal salt of an organic acid such as sodium acetate. A content of an alkali metal salt of an organic acid in a polyvinyl alcohol copolymer of use in the present invention is, but not limited to, generally 2.5% by mass or less. To obtain such a polyvinyl alcohol copolymer, the polyvinyl alcohol copolymer can be prepared by washing with a washing liquid. Examples of a washing liquid include methanol, acetone, methyl acetate, ethyl acetate, hexane and water. These can be used alone or as a mixture. Among these, methanol, methyl acetate and water are preferable.

The polyvinyl alcohol copolymer can comprise further structural units as long they do not affect the effect of the present invention. More preferably, the polyvinyl alcohol copolymer does not comprise any further structural units beyond the vinyl alcohol, vinyl acetate and alkyl-1-ene monomers.

The remaining washing liquid can be removed from the polyvinyl alcohol copolymer thus prepared, which is then dried. Any known method can be used for washing liquid removal and drying without limitation, drying is conducted preferably 2 to 6 hours while an oxygen concentration in a drying oven is less than 10% and a powder temperature is controlled to 90 to 120° C.

Surfactant System

The household cleaning composition comprises from 1.0% to 50%, preferably from 5.0% to 40%, most preferably from 15% to 35%, by weight of the total composition of a surfactant system.

Anionic Surfactant

The surfactant system comprises an anionic surfactant. The surfactant system can comprise at least 40%, preferably from 60% to 90%, more preferably from 65% to 85% by weight of the surfactant system of the anionic surfactant. The surfactant system is preferably free of fatty acid or salt thereof, since such fatty acids impede the generation of suds.

Suitable anionic surfactants can be selected from the group consisting of: alkyl sulphated surfactant, alkyl sulphonate surfactant, alkyl sulphosuccinate and dialkyl sulphosuccinate ester surfactants, and mixtures thereof.

The anionic surfactant can comprise at least 70%, preferably at least 85%, more preferably 100% by weight of the anionic surfactant of alkyl sulphated anionic surfactant.

The mol average alkyl chain length of the alkyl sulphated anionic surfactant can be from 8 to 18, preferably from 10 to 14, more preferably from 12 to 14, most preferably from 12 to 13 carbon atoms, in order to provide a combination of improved grease removal and enhanced speed of cleaning.

The alkyl chain of the alkyl sulphated anionic surfactant can have a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 57/43, preferably from 60/40 to 90/10, more preferably from 60/40 to 80/20, most preferably from 60/40 to 70/30, while not compromising suds mileage in the presence of particulate soils.

The relative molar amounts of C13 and C12 alkyl chains in the alkyl sulphated anionic surfactant can be derived from the carbon chain length distribution of the anionic surfactant. The carbon chain length distribution of the alkyl chains of the alkyl sulphated anionic surfactants can be obtained from the technical data sheets from the suppliers for the surfactant or constituent alkyl alcohol. Alternatively, the chain length distribution and average molecular weight of the fatty alcohols, used to make the alkyl sulphated anionic surfactant, can also be determined by methods known in the art. Such methods include capillary gas chromatography with flame ionisation detection on medium polar capillary column, using hexane as the solvent. The chain length distribution is based on the starting alcohol and alkoxylated alcohol. As such, the alkyl sulphated anionic surfactant should be hydrolysed back to the corresponding alkyl alcohol and alkyl alkoxylated alcohol before analysis, for instance using hydrochloric acid.

The alkyl sulphated anionic surfactant can be alkoxylated or free of alkoxylation. When alkoxylated, the alkyl sulphated anionic surfactant can have an average degree of alkoxylation of less than 3.5, preferably from 0.3 to 2.0, more preferably from 0.5 to 0.9, in order to improve low temperature physical stability and improve suds mileage of the compositions of the present invention. When alkoxylated, ethoxylation is preferred.

The average degree of alkoxylation is the mol average degree of alkoxylation (i.e., mol average alkoxylation degree) of all the alkyl sulphate anionic surfactant. Hence, when calculating the mol average alkoxylation degree, the mols of non-alkoxylated sulphate anionic surfactant are included:

$$\text{Mol average alkoxylation degree}=(x1*\text{alkoxylation degree of surfactant }1+x2*\text{ alkoxylation degree of surfactant }2+\ldots)/(x1+x2+\ldots)$$

wherein x1, x2, . . . are the number of moles of each alkyl (or alkoxy) sulphate anionic surfactant of the mixture and alkoxylation degree is the number of alkoxy groups in each alkyl sulphate anionic surfactant.

Preferred alkyl alkoxy sulphates are alkyl ethoxy sulphates

The alkyl sulphated anionic surfactant can have a weight average degree of branching of at least 10%, preferably from 20% to 60%, more preferably from 30% to 50%.

The alkyl sulphated anionic surfactant can comprise at least 5%, preferably at least 10%, most preferably at least 25%, by weight of the alkyl sulphated anionic surfactant, of branching on the C2 position (as measured counting carbon atoms from the sulphate group for non-alkoxylated alkyl sulphate anionic surfactants, and the counting from the alkoxy-group furthest from the sulphate group for alkoxylated alkyl sulphate anionic surfactants). More preferably, greater than 75%, even more preferably greater than 90%, by weight of the total branched alkyl content consists of C1-C5 alkyl moiety, preferably C1-C2 alkyl moiety. It has been found that formulating the inventive compositions using alkyl sulphate surfactants having the aforementioned degree of branching results in improved low temperature stability. Such compositions require less solvent in order to achieve good physical stability at low temperatures. As such, the compositions can comprise lower levels of organic solvent, of less than 5.0% by weight of the cleaning composition of organic solvent, while still having improved low temperature stability. Higher surfactant branching also provides faster initial suds generation, but typically less suds mileage. The weight average branching, described herein, has been found to provide improved low temperature stability, initial foam generation and suds longevity.

The weight average degree of branching for an anionic surfactant mixture can be calculated using the following formula:

$$\text{Weight average degree of branching }(\%)=[(x1*\text{wt \% branched alcohol 1 in alcohol }1+x2*\text{wt \% branched alcohol 2 in alcohol }2+\ldots)/(x1+x2+\ldots)]*100$$

wherein x1, x2, . . . are the weight in grams of each alcohol in the total alcohol mixture of the alcohols which were used as starting material before (alkoxylation and) sulphation to produce the alkyl (alkoxy) sulphate anionic surfactant. In the weight average degree of branching calculation, the weight of the alkyl alcohol used to form the alkyl sulphated anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionisation detection on medium polar capillary column, using hexane as the solvent. The weight average degree of branching and the distribution of branching is based on the starting alcohol used to produce the alkyl sulphated anionic surfactant.

Suitable counterions include alkali metal cation earth alkali metal cation, alkanolammonium or ammonium or substituted ammonium, but preferably sodium.

Suitable examples of commercially available alkyl sulphated anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The alcohols can be blended in order to achieve the desired mol fraction of C12 and C13 chains and the desired C13/C12 ratio, based on the relative fractions of C13 and C12 within the starting alcohols, as obtained from the technical data sheets from the suppliers or from analysis using methods known in the art.

The performance can be affected by the width of the alkoxylation distribution of the alkoxylated alkyl sulphate anionic surfactant, including grease cleaning, sudsing, low temperature stability and viscosity of the finished product. The alkoxylation distribution, including its broadness can be varied through the selection of catalyst and process conditions when making the alkoxylated alkyl sulphate anionic surfactant.

If ethoxylated alkyl sulphate is present, without wishing to be bound by theory, through tight control of processing conditions and feedstock material compositions, both during alkoxylation especially ethoxylation and sulphation steps, the amount of 1,4-dioxane by-product within alkoxylated especially ethoxylated alkyl sulphates can be reduced. Based on recent advances in technology, a further reduction of 1,4-dioxane by-product can be achieved by subsequent stripping, distillation, evaporation, centrifugation, microwave irradiation, molecular sieving or catalytic or enzymatic degradation steps. Processes to control 1,4-dioxane content within alkoxylated/ethoxylated alkyl sulphates have been described extensively in the art. Alternatively 1,4-dioxane level control within detergent formulations has also been described in the art through addition of 1,4-dioxane inhibitors to 1,4-dioxane comprising formulations, such as 5,6-dihydro-3-(4-morpholinyl)-1-[4-(2-oxo-1-piperidinyl)-phenyl]-2-(1-H)-pyridone, 3-α-hydroxy-7-oxo stereoisomer-mixtures of cholinic acid, 3-(N-methyl amino)-L-alanine, and mixtures thereof.

Anionic alkyl sulphonate or sulphonic acid surfactants suitable for use herein include the acid and salt forms of alkylbenzene sulphonates, alkyl ester sulphonates, primary and secondary alkane sulphonates such as paraffin sulfonates, alfa or internal olefin sulphonates, alkyl sulphonated (poly)carboxylic acids, and mixtures thereof. Suitable anionic sulphonate or sulphonic acid surfactants include: C5-C20 alkylbenzene sulphonates, more preferably C10-C16 alkylbenzene sulphonates, more preferably C11-C13 alkylbenzene sulphonates, C5-C20 alkyl ester sulphonates especially C5-C20 methyl ester sulfonates, C6-C22 primary or secondary alkane sulphonates, C5-C20 sulphonated (poly)carboxylic acids, and any mixtures thereof, but preferably C11-C13 alkylbenzene sulphonates. The aforementioned surfactants can vary widely in their 2-phenyl isomer content. Compared with sulfonation of alpha olefins, the sulfonation of internal olefins can occur at any position since the double bond is randomly positioned, which leads to the position of hydrophilic sulfonate and hydroxyl groups of IOS in the middle of the alkyl chain, resulting in a variety of twin-tailed branching structures. Alkane sulphonates include paraffin sulphonates and other secondary alkane sulfonate (such as Hostapur SAS60 from Clariant).

Alkyl sulfosuccinate and dialkyl sulfosuccinate esters are organic compounds with the formula MO3SCH(CO2R')CH2CO2R where R and R' can be H or alkyl groups, and M is a counter-ion such as sodium (Na). Alkyl sulfosuccinate and dialkyl sulfosuccinate ester surfactants can be alkoxylated or non-alkoxylated, preferably non-alkoxylated. The surfactant system may comprise further anionic surfactant. However, the composition preferably comprises less than 30%, preferably less than 15%, more preferably less than 10% by weight of the surfactant system of further anionic surfactant. Most preferably, the surfactant system comprises no further anionic surfactant, preferably no other anionic surfactant than alkyl sulphated anionic surfactant.

Co-Surfactant

In order to improve surfactant packing after dilution and hence improve suds mileage, the surfactant system can comprise a co-surfactant. The co-surfactant can be selected from the group consisting of an amphoteric surfactant, a zwitterionic surfactant and mixtures thereof.

The anionic surfactant to the co-surfactant weight ratio can be from 1:1 to 8:1, preferably from 2:1 to 5:1, more preferably from 2.5:1 to 4:1.

The composition preferably comprises from 0.1% to 20%, more preferably from 0.5% to 15% and especially from 2% to 10% by weight of the cleaning composition of the co-surfactant.

The surfactant system of the cleaning composition of the present invention preferably comprises up to 50%, preferably from 10% to 40%, more preferably from 15% to 35%, by weight of the surfactant system of a co-surfactant.

The co-surfactant is preferably an amphoteric surfactant, more preferably an amine oxide surfactant.

The amine oxide surfactant can be linear or branched, though linear are preferred. Suitable linear amine oxides are typically water-soluble, and characterized by the formula R1—N(R2)(R3) O wherein R1 is a C8-18 alkyl, and the R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides.

Preferably, the amine oxide surfactant is selected from the group consisting of: alkyl dimethyl amine oxide, alkyl amido propyl dimethyl amine oxide, and mixtures thereof. Alkyl dimethyl amine oxides are particularly preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the $\alpha$ carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein "symmetric" means that $|n1-n2|$ is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and
b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaine, amidazoliniumbetaine, sulphobetaine (INCI Sultaines) as well as the phosphobetaine, and preferably meets formula (II):

$$R^1—[CO—X(CH_2)_n]_x—N^+(R^2)(R_3)—(CH_2)m—[CH(OH)—CH_2]_y—Y^- \quad (II)$$

wherein in formula (II),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue;

X is selected from the group consisting of: NH, NR4 wherein R4 is a C1-4 alkyl residue, O, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, SO3, OPO(OR5)O or P(O)(OR5)O, wherein R5 is H or a C1-4 alkyl residue.

Preferred betaines are the alkyl betaines of formula (IIa), the alkyl amido propyl betaine of formula (IIb), the sulphobetaine of formula (IIc) and the amido sulphobetaine of formula (IId):

$$R^1—N^+(CH_3)_2—CH_2COO^- \quad (IIa)$$

$$R^1—CO—NH—(CH_2)_3—N^+(CH_3)_2—CH_2COO^- \quad (IIb)$$

$$R^1—N^+(CH_3)_2—CH_2CH(OH)CH_2SO_3^- \quad (IIc)$$

$$R^1—CO—NH—(CH_2)_3—N^+(CH_3)_2—CH_2CH(OH)CH_2SO_3^- \quad (IId)$$

in which R1 has the same meaning as in formula (II). Particularly preferred are the carbobetaines [i.e., wherein Y—=COO— in formula (I)] of formulae (IIa) and (IIb), more preferred are the alkylamidobetaine of formula (IIb).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine is particularly preferred.

Nonionic Surfactant:

The surfactant system can further comprise a nonionic surfactant. Suitable nonionic surfactants include alkoxylated alcohol nonionic surfactants, alkyl polyglucoside nonionic surfactants, and mixtures thereof.

Alkoxylated Alcohol Nonionic Surfactant:

Preferably, the surfactant system of the composition of the present invention further comprises from 1% to 25%, preferably from 1.25% to 20%, more preferably from 1.5% to 15%, most preferably from 1.5% to 5%, by weight of the surfactant system, of an alkoxylated alcohol non-ionic surfactant.

Preferably, the alkoxylated alcohol non-ionic surfactant is a linear or branched, primary or secondary alkyl alkoxylated non-ionic surfactant, preferably an alkyl ethoxylated non-ionic surfactant, preferably comprising on average from 9 to 15, preferably from 10 to 14 carbon atoms in its alkyl chain and on average from 5 to 12, preferably from 6 to 10, most preferably from 7 to 8, units of ethylene oxide per mole of alcohol.

Alkyl Polyglucoside Nonionic Surfactant:

If present, the alkyl polyglucoside can be present in the surfactant system at a level of from to 20%, preferably from 0.75% to 15%, more preferably from 1% to 10%, most preferably from 1% to 5% by weight of the surfactant composition. Alkyl polyglucoside nonionic surfactants are typically more sudsing than other nonionic surfactants such as alkyl ethoxlated alcohols.

A combination of alkylpolyglucoside and anionic surfactant especially alkyl sulfate anionic surfactant, has been found to improve polymerized grease removal, suds mileage performance, reduced viscosity variation with changes in the surfactant and/or system, and a more sustained Newtonian rheology.

The alkyl polyglucoside surfactant can be selected from C6-C18 alkyl polyglucoside surfactant. The alkyl polyglucoside surfactant can have a number average degree of polymerization of from 0.1 to 3.0, preferably from 1.0 to 2.0, more preferably from 1.2 to 1.6. The alkyl polyglucoside surfactant can comprise a blend of short chain alkyl polyglucoside surfactant having an alkyl chain comprising 10 carbon atoms or less, and mid to long chain alkyl polyglucoside surfactant having an alkyl chain comprising greater than 10 carbon atoms to 18 carbon atoms, preferably from 12 to 14 carbon atoms.

Short chain alkyl polyglucoside surfactants have a monomodal chain length distribution between C8-C10, mid to long chain alkyl polyglucoside surfactants have a monomodal chain length distribution between C10-C18, while mid chain alkyl polyglucoside surfactants have a monomodal chain length distribution between C12-C14. In contrast, C8 to C18 alkyl polyglucoside surfactants typically have a monomodal distribution of alkyl chains between C8 and C18, as with C8 to C16 and the like. As such, a combination of short chain alkyl polyglucoside surfactants with mid to long chain or mid chain alkyl polyglucoside surfactants have a broader distribution of chain lengths, or even a bimodal distribution, than non-blended C8 to C18 alkyl polyglucoside surfactants. Preferably, the weight ratio of short chain alkyl polyglucoside surfactant to long chain alkyl polyglucoside surfactant is from 1:1 to 10:1, preferably from 1.5:1 to 5:1, more preferably from 2:1 to 4:1. It has been found that a blend of such short chain alkyl polyglucoside surfactant and long chain alkyl polyglucoside surfactant results in faster dissolution of the detergent solution in water and improved initial sudsing, in combination with improved suds stability.

C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation). Glucopon® 215UP is a preferred short chain APG surfactant. Glucopon® 600CSUP is a preferred mid to long chain APG surfactant.

In preferred compositions, the surfactant system can comprise an alkyl sulfate anionic surfactant having an average degree of branching of less than 10% and alkyl polyglucoside nonionic surfactant.

Further Ingredients:

The composition can comprise further ingredients such as those selected from: amphiphilic alkoxylated polyalkyleneimines, cyclic polyamines, triblock copolymers, hydrotropes, organic solvents, other adjunct ingredients such as those described herein, and mixtures thereof.

Amphiphilic Alkoxylated Polyalkyleneimine:

The composition of the present invention may further comprise from 0.05% to 2%, preferably from 0.07% to 1% by weight of the total composition of an amphiphilic polymer. Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

A preferred amphiphilic alkoxylated polyethyleneimine polymer has the general structure of formula (I):

(I)

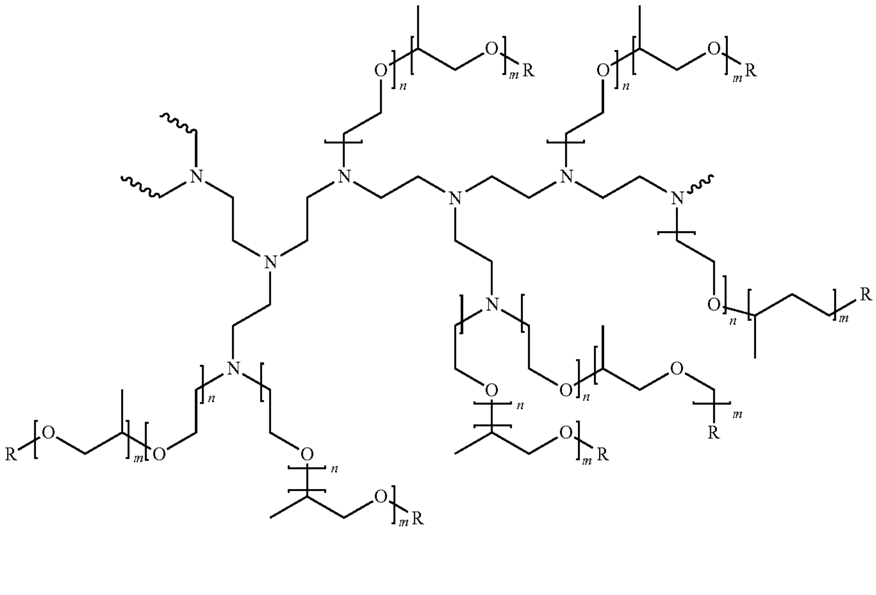

wherein the polyethyleneimine backbone has a weight average molecular weight of 600, n of formula (I) has an average of 10, m of formula (I) has an average of 7 and R of formula (I) is selected from hydrogen, a $C_1$-$C_4$ alkyl and mixtures thereof, preferably hydrogen. The degree of permanent quaternization of formula (I) may be from 0% to 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (I) but wherein the polyethyleneimine backbone has a weight average molecular weight of 600 Da, n of Formula (I) has an average of 24, m of Formula (I) has an average of 16 and R of Formula (I) is selected from hydrogen, a $C_1$-$C_4$ alkyl and mixtures thereof, preferably hydrogen. The degree of permanent quaternization of Formula (I) may be from 0% to 22% of the polyethyleneimine backbone nitrogen atoms and is preferably 0%. The molecular weight of this amphiphilic alkoxylated polyethyleneimine polymer preferably is between 25,000 and 30,000, most preferably 28,000 Da.

The amphiphilic alkoxylated polyethyleneimine polymers can be made by the methods described in more detail in PCT Publication No. WO 2007/135645.

Alternatively, the compositions can be free of amphiphilic polymers.

Cyclic Polyamine

The composition can comprise a cyclic polyamine having amine functionalities that helps cleaning. The composition of the invention preferably comprises from 0.1% to 3%, more preferably from 0.2% to 2%, and especially from 0.5% to 1%, by weight of the total composition, of the cyclic polyamine.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —CH3 and the rest are H provided for improved grease cleaning performance.

Accordingly, the most preferred cyclic polyamine for use with the cleaning composition of the present invention are cyclic polyamine selected from the group consisting of: 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present invention.

Suitable cyclic polyamines can be supplied by BASF, under the Baxxodur tradename, with Baxxodur ECX-210 being particularly preferred.

A combination of the cyclic polyamine and magnesium sulphate is particularly preferred. As such, the composition can further comprise magnesium sulphate at a level of from 0.001% to 2.0%, preferably from 0.005% to 1.0%, more preferably from 0.01% to 0.5% by weight of the composition.

Triblock Copolymer

The composition of the invention can comprise a triblock copolymer. The triblock co-polymers can be present at a level of from 1% to 20%, preferably from 3% to 15%, more preferably from 5% to 12%, by weight of the total composition. Suitable triblock copolymers include alkylene oxide triblock co-polymers, defined as a triblock co-polymer having alkylene oxide moieties according to Formula (I): (EO)x(PO)y(EO)x, wherein EO represents ethylene oxide, and each x represents the number of EO units within the EO block. Each x can independently be on average of from 5 to 50, preferably from 10 to 40, more preferably from 10 to 30. Preferably x is the same for both EO blocks, wherein the "same" means that the x between the two EO blocks varies within a maximum 2 units, preferably within a maximum of 1 unit, more preferably both x's are the same number of units. PO represents propylene oxide, and y represents the number of PO units in the PO block. Each y can on average be from between 28 to 60, preferably from 30 to 55, more preferably from 30 to 48.

Preferably the triblock co-polymer has a ratio of y to each x of from 3:1 to 2:1. The triblock co-polymer preferably has a ratio of y to the average x of 2 E0 blocks of from 3:1 to 2:1. Preferably the triblock co-polymer has an average weight percentage of total E-0 of between 30% and 50% by weight of the tri-block co-polymer. Preferably the triblock co-polymer has an average weight percentage of total PO of between 50% and 70% by weight of the triblock co-polymer. It is understood that the average total weight % of EO and PO for the triblock co-polymer adds up to 100%. The triblock co-polymer can have an average molecular weight of between 2060 and 7880, preferably between 2620 and 6710, more preferably between 2620 and 5430, most preferably between 2800 and 4700. Average molecular weight is determined using a 1H NMR spectroscopy (see Thermo scientific application note No. AN52907).

Triblock co-polymers have the basic structure ABA, wherein A and B are different homopolymeric and/or monomeric units. In this case A is ethylene oxide (EO) and B is propylene oxide (PO). Those skilled in the art will recognize the phrase "block copolymers" is synonymous with this definition of "block polymers".

Triblock co-polymers according to Formula (I) with the specific EO/PO/EO arrangement and respective homopolymeric lengths have been found to enhances suds mileage performance of the household cleaning composition in the presence of greasy soils and/or suds consistency throughout dilution in the wash process.

Suitable EO-PO-EO triblock co-polymers are commercially available from BASF such as Pluronic® PE series, and from the Dow Chemical Company such as Tergitol™ L series. Particularly preferred triblock co-polymer from BASF are sold under the tradenames Pluronic® PE6400 (MW ca 2900, ca 40 wt % EO) and Pluronic® PE 9400 (MW ca 4600, 40 wt % EO). Particularly preferred triblock co-polymer from the Dow Chemical Company is sold under the tradename Tergitol™ L64 (MW ca 2700, ca 40 wt % EO).

Preferred triblock co-polymers are readily biodegradable under aerobic conditions.

The composition of the present invention may further comprise at least one active selected from the group consisting of: i) a salt, ii) a hydrotrope, iii) an organic solvent, and mixtures thereof.

Salt:

The composition of the present invention may comprise from about 0.05% to about 2%, preferably from about 0.1% to about 1.5%, or more preferably from about 0.5% to about 1%, by weight of the total composition of a salt, preferably a monovalent or divalent inorganic salt, or a mixture thereof, more preferably selected from: sodium chloride, sodium sulphate, and mixtures thereof. Sodium chloride is most preferred.

Hydrotrope:

The composition of the present invention may comprise from about 0.1% to about 10%, or preferably from about 0.5% to about 10%, or more preferably from about 1% to about 10% by weight of the total composition of a hydrotrope or a mixture thereof, preferably sodium cumene sulphonate.

Organic Solvent:

The composition can comprise from about 0.1% to about 10%, or preferably from about to about 10%, or more preferably from about 1% to about 10% by weight of the total composition of an organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol. Polyalkyleneglycols, especially polypropyleneglycol, is the preferred glycol, with polypropyleneglycols having a weight average molecular weight of from 750 Da to 1,400 Da being particularly preferred.

Adjunct Ingredients

The cleaning composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Packaged Product

The hand dishwashing detergent composition can be packaged in a container, typically plastic containers. Suitable containers comprise an orifice. Typically, the container comprises a cap, with the orifice typically comprised on the cap. The cap can comprise a spout, with the orifice at the exit of the spout. The spout can have a length of from 0.5 mm to 10 mm.

The orifice can have an open cross-sectional surface area at the exit of from 3 $mm^2$ to 20 $mm^2$, preferably from 3.8 $mm^2$ to 12 $mm^2$, more preferably from 5 $mm^2$ to 10 $mm^2$, wherein the container further comprises the composition according to the invention. The cross-sectional surface area is measured perpendicular to the liquid exit from the container (that is, perpendicular to the liquid flow during dispensing).

The container can typically comprise from 200 ml to 5,000 ml, preferably from 350 ml to 2000 ml, more preferably from 400 ml to 1,000 ml of the household cleaning composition.

The hand dishwashing detergent composition can be packaged in a container, typically plastic containers. Suitable containers comprise an orifice. Typically, the container comprises a cap, with the orifice typically comprised on the cap. The cap can comprise a spout, with the orifice at the exit of the spout. The spout can have a length of from 0.5 mm to 10 mm.

Alternatively, the hand dishwashing detergent composition can be packaged in an inverted container. Such inverted containers typically comprise a cap at the bottom of the container, the cap comprising either a closure or a self-sealing valve, or a combination thereof. The cap preferably comprises a self-sealing valve. Suitable self-sealing valves include slit-valves. The self-sealing valve defines a dispensing orifice that is reactively openable when the pressure on the valve interior side exceeds the pressure on the valve exterior side. The bottom dispensing container can comprise an impact resistance system, such as that described in WO2019108293A1.

Method of Washing

The invention is further directed to a method of manually washing dishware with the composition of the present invention. The method comprises the steps of delivering a composition of the present invention to a volume of water to form a wash solution and immersing the dishware in the solution. The dishware is be cleaned with the composition in the presence of water.

Optionally, the dishware can be rinsed. By “rinsing”, it is meant herein contacting the dishware cleaned with the process according to the present invention with substantial quantities of appropriate solvent, typically water. By “substantial quantities”, it is meant usually about 1 to about 20 L, or under running water.

The composition herein can be applied in its diluted form. Soiled dishware is contacted with an effective amount, typically from about 0.5 mL to about 20 mL (per about 25 dishes being treated), preferably from about 3 mL to about 10 mL, of the cleaning composition, preferably in liquid form, of the present invention diluted in water. The actual amount of cleaning composition used will be based on the judgment of the user and will typically depend upon factors such as the particular product formulation of the cleaning composition, including the concentration of active ingredients in the cleaning composition, the number of soiled dishes to be cleaned, the degree of soiling on the dishes, and the like. Generally, from about 0.01 mL to about 150 mL, preferably from about 3 mL to about 40 mL of a cleaning composition of the invention is combined with from about 2,000 mL to about 20,000 mL, more typically from about 5,000 mL to about 15,000 mL of water in a sink. The soiled dishware are immersed in the sink containing the diluted cleaning compositions then obtained, before contacting the soiled surface of the dishware with a cloth, sponge, or similar cleaning implement. The cloth, sponge, or similar cleaning implement may be immersed in the cleaning composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is accompanied by a concurrent scrubbing of the dishware.

Alternatively, the composition herein can be applied in its neat form to the dish to be treated. By “in its neat form”, it is meant herein that said composition is applied directly onto the surface to be treated, or onto a cleaning device or implement such as a brush, a sponge, a nonwoven material, or a woven material, without undergoing any significant dilution by the user (immediately) prior to application. “In its neat form”, also includes slight dilutions, for instance, arising from the presence of water on the cleaning device, or the addition of water by the consumer to remove the remaining quantities of the composition from a bottle. Therefore, the composition in its neat form includes mixtures having the composition and water at ratios ranging from 50:50 to 100:0, preferably 70:30 to 100:0, more preferably 80:20 to 100:0, even more preferably 90:10 to 100:0 depending on the user habits and the cleaning task.

METHODS

A. Viscosity Measurement

The viscosity is measured using a controlled stress rheometer (such as an HAAKE MARS from Thermo Scientific, or equivalent), using a 60 mm 1° cone and a gap size of 52 microns at 20° C. After temperature equilibration for 2 minutes, the sample is sheared at a shear rate of 10 $s^{-1}$ for 30 seconds. The reported viscosity of the liquid household cleaning compositions is defined as the average shear stress between 15 seconds and 30 seconds shearing divided by the applied shear rate of 10 $s^{-1}$ at 20° C.

B. Suds Mileage

The objective of the Suds Mileage Test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1. 0.12 wt % of the test composition is dispensed through a plastic pipette at a flow rate of 0.67 mL/sec at a height of 37 cm above the bottom surface of a sink (dimension: 300 mm diameter and 288 mm height) into a water stream having a water hardness of 2.67 mmol/L equivalence of Ca (15 gpg) and water temperature of 35° C., that is filling up the sink to 4 L at a constant pressure of 4 bar.
2. An initial suds volume generated (measured as average foam volume X above the liquid in the sink (expressed in $cm^3$) is recorded immediately after end of filling.
3. A fixed amount (6 mL) of a soil with the defined composition below is immediately injected into the middle of the sink.
4. The resultant solution is mixed with a metal blade (10 cm×5 cm) positioned in the middle of the sink at the air liquid interface under an angle of 45° rotating at 85 RPM for 20 revolutions.
5. Another measurement of the total suds volume is recorded immediately after end of blade rotation.
6. Steps 3-5 are repeated until the measured total suds volume reaches a level of 400 $cm^3$ or less. The amount of added soil that is needed to get to the 400 $cm^3$ level is considered as the suds mileage for the test composition.
7. Each test composition is tested 4 times per testing condition (i.e., water temperature, composition concentration, water hardness, soil type).
8. The average suds mileage is calculated as the average of the 4 replicates for each sample for a defined test condition.
9. The Suds Mileage Index is calculated by comparing the average mileage of a test composition sample versus a reference composition sample. The calculation is as follows:

$$\text{Suds Mileage Index} = \frac{\text{Average number of soil additions of test composition}}{\text{Average number of soil additions of reference composition}} \times 100$$

The greasy soil composition used in the test is produced through standard mixing of the components described in Table 1.

TABLE 1

| Greasy Soil | |
|---|---|
| Ingredient | Weight % |
| Crisco Oil | 12.730 |
| Crisco shortening | 27.752 |
| Lard | 7.638 |
| Refined Rendered Edible Beef Tallow | 51.684 |
| Oleic Acid, 90% (Techn) | 0.139 |
| Palmitic Acid, 99+% | 0.036 |
| Stearic Acid, 99+% | 0.021 |

EXAMPLES

The following examples are provided to further illustrate the present invention and are not to be construed as limitations of the present invention, as many variations of the present invention are possible without departing from its scope.

The suds mileage, composition phase stability and viscosity were evaluated for inventive compositions comprising a polyvinyl alcohol copolymer as described herein, as well as for comparative compositions comprising a polyvinyl alcohol homopolymer or lacking a polyvinyl alcohol polymer.

The composition phase stability was evaluated by storing 30 ml of the composition in closed glass bottles (106 ml glass jar with twist off lid, available from VWR, reference SPVAH02744-20) at room temperature (20° C.) and at 50° C., followed by a visual inspection for any phase separation weekly for a period up to a one year at room temperature, and daily for a period up to 1 month at 50° C.

The polyvinyl alcohol copolymers and polyvinyl alcohol homopolymers used in the inventive and comparative examples are described in table 1 (in terms of their degree of hydrolysis, dH, degree of polymerisation, DP, and type and degree of substitution (dS).

Polymers 1 and 2 (of use in the present invention) and comparative polymer A all had essentially the same degree of hydrolysis (dH) and degree of polymerisation (dP). Polymers 1 and 2 comprised dodecyl (C12) alkyl substitutions to degree (dS) 1.27% and 1.61% respectively. In contrast, comparative polymer A was a homopolymer (hence having zero degree of substitution).

TABLE 1

| Polyvinyl alcohol copolymers of use in the present invention and comparative homopolymer. | | | |
|---|---|---|---|
| | dH | dP | dS |
| Polymer 1[1] | 74 | 540 | 1.27% C12 |
| Polymer 2[1] | 71 | 480 | 1.61% C12 |
| polymer A[2] | 74 | 500 | 0 |

[1]Polyvinyl alcohol copolymers of use in the invention, prepared using the method described herein

[2]Comparative polyvinyl alcohol homopolymer sold by Kuraray Japan, under the tradename Poval ® 5-74

The comparative composition of example A was prepared by simple mixing in a batch process, and did not contain any polyvinyl alcohol homopolymer or copolymer. Inventive composition example 1 had the same composition as composition A, but further comprised 2% of polymer 1. Inventive composition example 2 had the same composition as composition A, but further comprised 2% of polymer 2. Comparative composition example B had the same composition as composition A, but further comprised 2% of polymer A.

TABLE 2

Inventive and comparative liquid detergent compositions

| | Ex. A* wt % | Ex. 1 wt % | Ex. 2 wt % | Ex. B* wt % |
|---|---|---|---|---|
| C12-13 alkyl ethoxylated (EO0.6) sulphate (30.4% branching) | 19.6 | 19.6 | 19.6 | 19.6 |
| C12-14 dimethyl amine oxide | 6.5 | 6.5 | 6.5 | 6.5 |
| C9-11 EO8 nonionic surfactant | 1.0 | 1.0 | 1.0 | 1.0 |
| NaCl | 0.7 | 0.7 | 0.7 | 0.7 |
| Ethanol | 1.8 | 1.8 | 1.8 | 1.8 |
| 1,2-polypropylene glycol (MW2000) | 0.7 | 0.7 | 0.7 | 0.7 |
| Polymer 1[1] | — | 2 | — | — |
| Polymer 2[1] | — | — | 2 | — |
| polymer A[2] | — | — | — | 2 |
| Minors (dye, perfume, preservative . . .) | 0.5 | 0.5 | 0.5 | 0.5 |
| Water | to 100% | to 100% | to 100% | to 100% |
| pH (as 10% aqueous solution) | 9.0 | 9.0 | 9.0 | 9.0 |
| Suds mileage in presence of greasy soil (35° C., 2.67 mmol/l $CaCO_3$ [15 dH]) | 100 | 110 | 115 | 106 |
| Viscosity (cps) | 1336 | 2689 | 3839 | 1345 |
| Phase stability at room temperature (20° C.) | >1 year | >1 year | >1 year | 7 months |
| Stability at 50° C. | >1 month | >1 month | >1 month | 10 days |

*Comparative

As can be seen from the above results, formulating the household cleaning composition with a polyvinyl alcohol copolymer instead of a polyvinyl alcohol homopolymer resulted in a further improvement in the suds mileage in the presence of greasy soil. As a comparison, the surfactant level would need to be increased by more than 10% in order to achieve the same increase in suds mileage, with the risk of initial over-sudsing. The viscosity was also significantly improved. As such, the copolymers of the present invention can enable a maintained or even an improved suds mileage with a similar composition viscosity, at lower surfactant levels. The surfactant level can therefore be tuned lower to provide the desired cleaning benefit, while still providing the desired level of sudsing. This is in contrast to prior art formulae where higher levels of surfactant are added to provide the desired suds mileage, even though the additional surfactant is surplus to the cleaning needs. As can be seen from the data above, the phase stability, both at room temperature and at elevated temperatures is also improved in comparison to compositions comprising comparative homopolymers.

The test was repeated using the polyvinyl alcohol copolymers and homopolymer of table 3. The polyvinyl alcohol copolymers and homopolymer of table 3 had a lower degree of hydrolysis (dH) to that of the polymers of table 1. In addition, comparative homopolymer B had a lower degree of polymerisation (dP) than comparative homopolymer A.

TABLE 3

Polyvinyl alcohol copolymers of use in the present invention.

| | dH | dP | dS |
|---|---|---|---|
| Polymer 3[1] | 50 | 540 | 1.27% C12 |
| Polymer 4[1] | 39 | 537 | 1.27% C12 |
| Polymer 5[1] | 42 | 480 | 1.61% C12 |
| Polymer B[3] | 45 | 300 | 0 |

[3]Comparative polyvinyl alcohol homopolymer sold by Kuraray Japan, under the tradename Poval ® LM30

The polymers were formulated into the compositions of table 4.

TABLE 4

Liquid detergent compositions

| | Ex. A* wt % | Ex. 3 wt % | Ex. 4 wt % | Ex. 5 wt % | Ex. C* wt % |
|---|---|---|---|---|---|
| C12-13 alkyl sulphate (30.4% branching) | 19.6 | 19.6 | 19.6 | 19.6 | 19.6 |
| C12-14 dimethyl amine oxide | 6.5 | 6.5 | 6.5 | 6.5 | 6.5 |
| C9-11 EO8 nonionic surfactant | 1.0 | 1.0 | 1.0 | 1.0 | 1.0 |
| NaCl | 0.7 | 0.7 | 0.7 | 0.7 | 0.7 |
| Ethanol | 1.8 | 1.8 | 1.8 | 1.8 | 1.8 |
| 1,2-polypropylene glycol (MW2000) | 0.7 | 0.7 | 0.7 | 0.7 | 0.7 |

TABLE 4-continued

Liquid detergent compositions

| | Ex. A* wt % | Ex. 3 wt % | Ex. 4 wt % | Ex. 5 wt % | Ex. C* wt % |
|---|---|---|---|---|---|
| Polymer 3[1] | — | 2.0 | — | — | — |
| Polymer 4[1] | — | — | 2.0 | — | — |
| Polymer 5[1] | — | — | — | 2.0 | — |
| Polymer B[3] | — | — | — | — | 2.0 |
| Minors (dye, perfume, preservative . . .) | 0.5 | 0.5 | 0.5 | 0.5 | 0.5 |
| Water | to 100% | to 100% | to 100% | to 100% | to 100% |
| pH (as 10% aqueous solution) | 9.0 | 9.0 | 9.0 | 9.0 | 9.0 |
| Suds mileage in presence of greasy soil (35° C., 2.67 mmol/l $CaCO_3$ [15 dH]) | 100 | 109 | 112 | 111 | 111 |
| Viscosity (cps) | 1336 | 1930 | 2200 | 2270 | 714 |
| Stability at room temperature (20° C.) | >1 year | >1 year | >1 year | >1 year | >1 year |

As can be seen from the results of table 4, reducing the degree of hydrolysis and degree of polymerisation of the comparative polyvinyl alcohol homopolymer results in an improvement in suds mileage and an improved phase stability. However, both are at the expense of viscosity. In contrast, when formulating with the alkyl substituted polyvinyl alcohol copolymer, the improvement in suds mileage, viscosity build and phase stability are still present.

The polyvinyl alcohol copolymers of table 5 have an average degree of hydrolysis (dH) which is outside the range of use in the compositions of the present invention. These comparative polyvinyl alcohol copolymers were also added to the household care compositions of example A at a level of 2.0% by weight.

The resultant compositions comprising comparative polymers C to K all showed phase instability after short periods and lower suds mileage than the compositions comprising the copolymers of use in the present invention.

TABLE 5

Comparative polyvinyl alcohol co-polymers

| | dH | dP | dS | Stable at room temperature | Suds mileage in presence of greasy soil (35° C., 2.67 mmol/l [15 dH]) |
|---|---|---|---|---|---|
| polymer C | 99 | 1830 | 0.1% C12 | No | n.m.* |
| polymer D | 98 | 2070 | 0.2% C12 | No | n.m.* |
| polymer E | 98 | 750 | 0.3% C12 | No | n.m.* |
| polymer F | 98 | 750 | 0.6% C12 | No | n.m.* |
| polymer G | 98 | 620 | 0.5% C18 | No | n.m.* |
| polymer H | 90 | 2070 | 0.2% C12 | No | n.m.* |
| polymer I | 89 | 620 | 0.5% C18 | No | n.m.* |
| polymer J | 88 | 750 | 0.3% C12 | No | n.m.* |
| polymer K | 86 | 1830 | 0.1% C12 | No | n.m.* |
| polymer L | 88 | 750 | 0.6% C6 | 3 weeks | 107 |
| polymer M | 88 | 750 | 1.2% C12 | 8 months | 103 |

*not measured since product was not stable

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A household cleaning composition comprising:

a. from about 1.0% to about 50% by weight of the total composition of a surfactant system; and b. a polyvinyl alcohol copolymer, wherein the polyvinyl alcohol copolymer comprises vinyl alcohol monomers, vinyl acetate monomers, and alkyl-1-ene monomers, wherein the alkyl-1-ene monomers have an alkyl chain comprising on average from 8 to 20 carbon atoms, wherein the polyvinyl alcohol copolymer has:

i. an average degree of hydrolysis (dH) of from about 30% to about 80%, ii. a weight average degree of polymerisation (dP) of from about 200 to about 800, and iii. an average degree of alkyl-1-ene monomer molar substitution (dS) of from about 0.25% to about 4.0%.

2. The household cleaning composition according to claim 1, wherein the polyvinyl alcohol copolymer is present at a level of from about 0.1% to about 4.0% by weight of the composition.

3. The household cleaning composition according to claim 2, wherein the polyvinyl alcohol copolymer is present at a level of from about 0.5% to about 2.0% by weight of the composition.

4. The household cleaning composition according to claim 1, wherein the polyvinyl alcohol copolymer has an average degree of hydrolysis of from about 40% to about 80%.

5. The household cleaning composition according to claim 4, wherein the polyvinyl alcohol copolymer has an average degree of hydrolysis of from about 60% to about 80%.

6. The household cleaning composition according to claim 1, wherein the polyvinyl alcohol copolymer has an average degree of alkyl-1-ene monomer molar substitution (dS) of from about 0.5% to about 3.0%.

7. The household cleaning composition according to claim 6, wherein the polyvinyl alcohol copolymer has an average degree of alkyl-1-ene monomer molar substitution (dS) of from about 1.0% to about 2.0%.

8. The household cleaning composition according to claim 1, wherein the polyvinyl alcohol copolymer has an average degree of polymerisation of from about 300 to about 700.

9. The household cleaning composition according to claim 1, wherein in the polyvinyl alcohol copolymer, the alkyl-1-ene monomers have an alkyl chain comprising on average from 10 to 18 carbon atoms.

10. The household cleaning composition according to claim 9, wherein in the polyvinyl alcohol copolymer, the alkyl-1-ene monomers have an alkyl chain comprising on average from 12 to 16 carbon atoms.

11. The household cleaning composition according to claim 1, wherein the composition comprises from about 5.0% to about 40% by weight of the total composition of the surfactant system.

12. The household cleaning composition according to claim 1, wherein the surfactant system comprises at least about 40% by weight of the surfactant system of an anionic surfactant.

13. The household cleaning composition according to claim 8, wherein the anionic surfactant comprises alkyl sulphated anionic surfactant, at least about 70% by weight of the anionic surfactant of the alkyl sulphated anionic surfactant.

14. The household cleaning composition according to claim 13, wherein the anionic surfactant comprises alkyl sulphated anionic surfactant, at least about 85% by weight of the anionic surfactant of the alkyl sulphated anionic surfactant.

15. The household cleaning composition according to claim 13, wherein the alkyl sulphated anionic surfactant has an average alkyl chain length of from 8 to 18 carbon atoms.

16. The household cleaning composition according to claim 13, wherein the alkyl sulphated anionic surfactant has an average degree of alkoxylation of less than about 5.

17. The household cleaning composition according to claim 13, wherein the alkyl sulphated anionic surfactant has a weight average degree of branching of at least about 10%.

18. The household cleaning composition according to claim 12, wherein the surfactant system further comprises a co-surfactant selected from the group consisting of an amphoteric surfactant, a zwitterionic surfactant and mixtures thereof.

19. The household cleaning composition according to claim 18, wherein the surfactant system comprises amphoteric surfactant selected from amine oxide surfactant, wherein the amine oxide surfactant is selected from the group consisting of: alkyl dimethyl amine oxide, alkyl amido propyl dimethyl amine oxide, and mixtures thereof.

20. The household cleaning composition according to claim 18, wherein the weight ratio of the anionic surfactant to the co-surfactant is from about 1:1 to about 8:1.

* * * * *